Dec. 1, 1959  H. G. YETTER  2,915,131
JOINTER DEVICE MOUNTING BRACKET
Filed Nov. 25, 1958  3 Sheets-Sheet 1
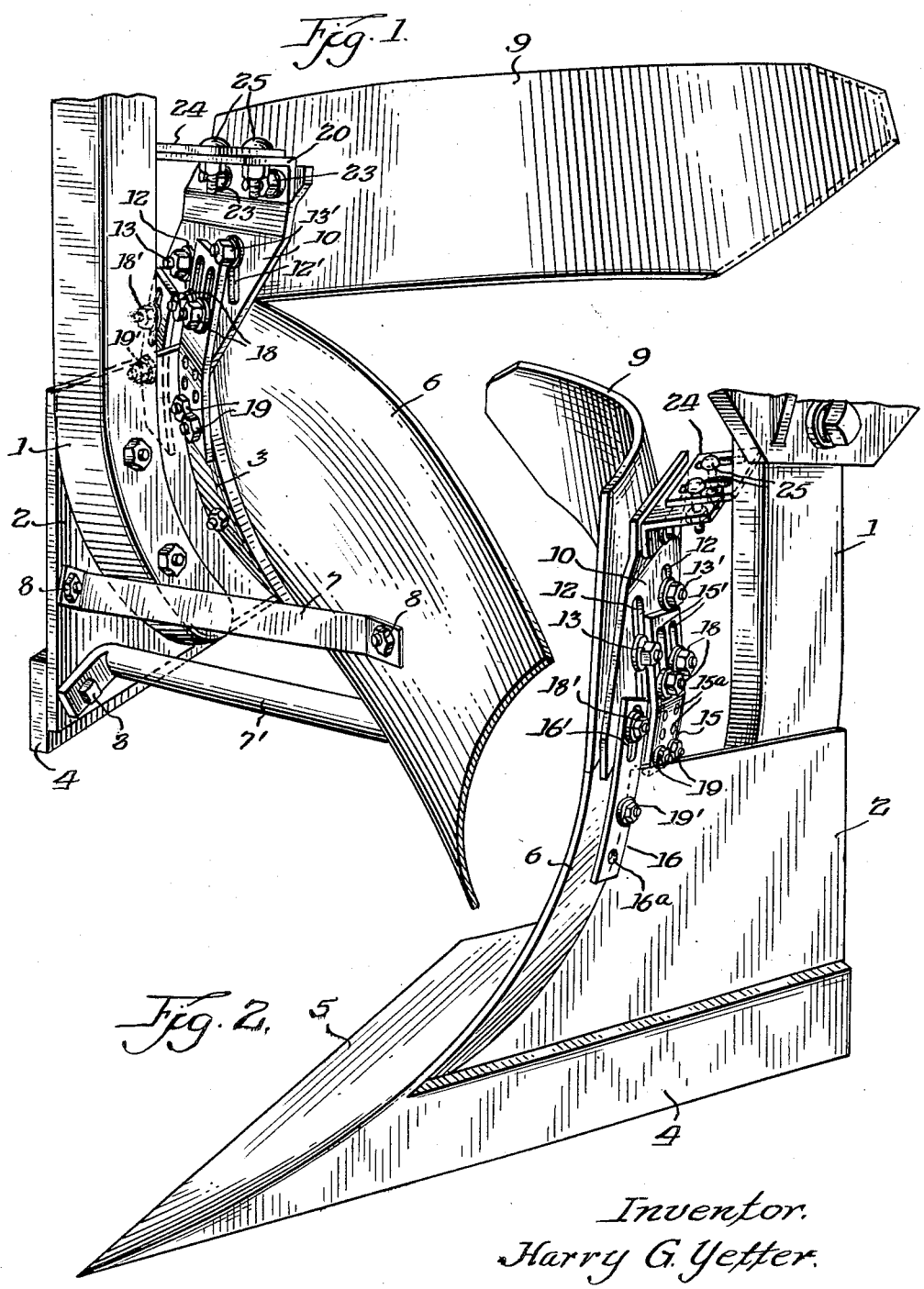
Inventor.
Harry G. Yetter.
By W. F. Kellogg, Atty.

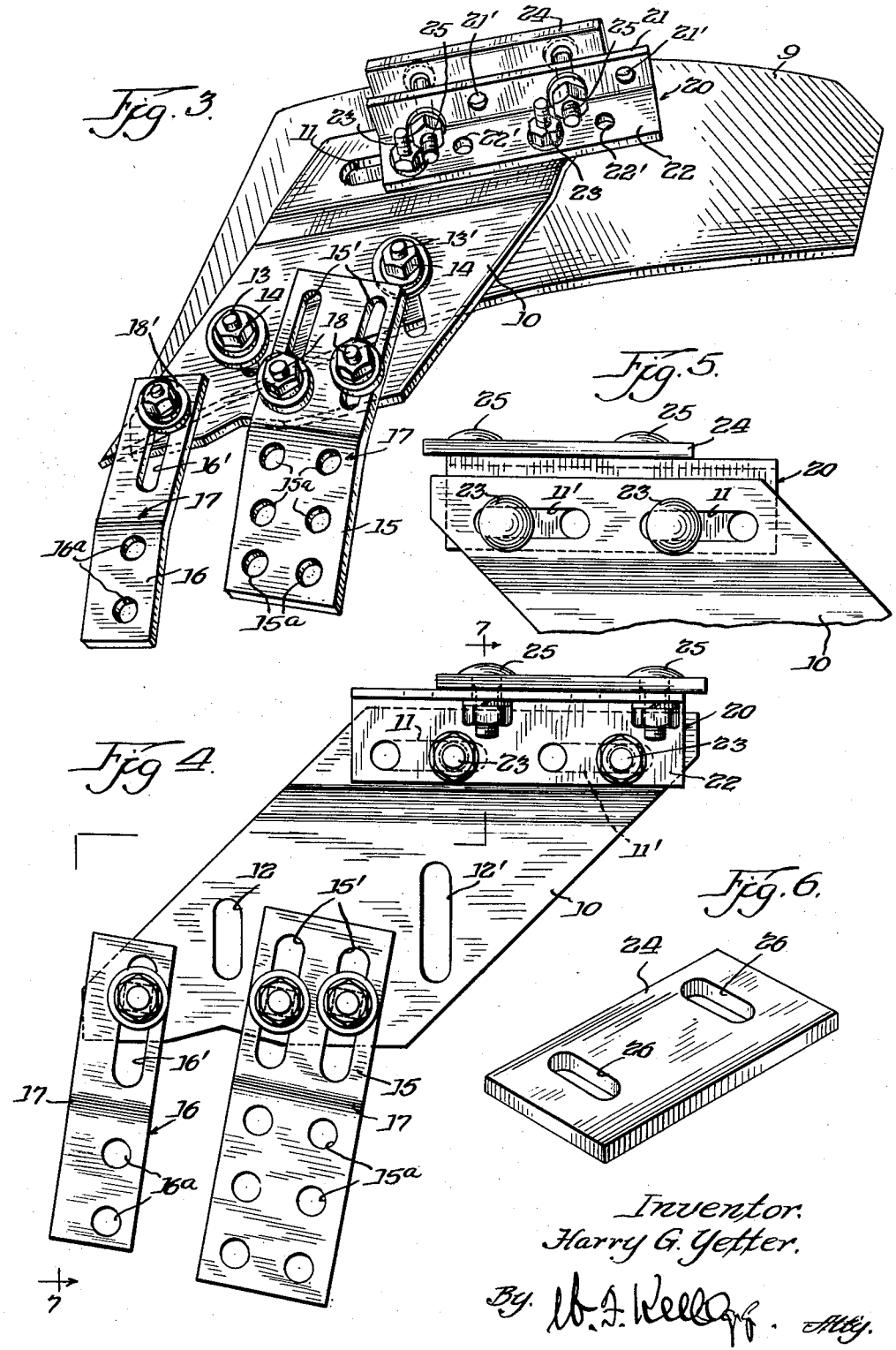

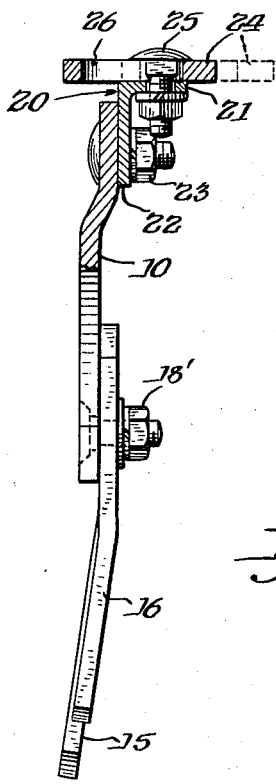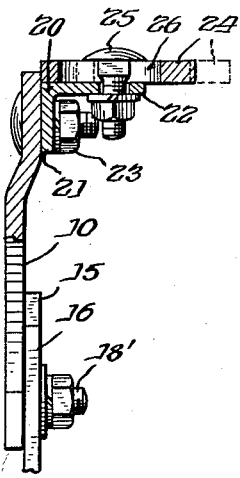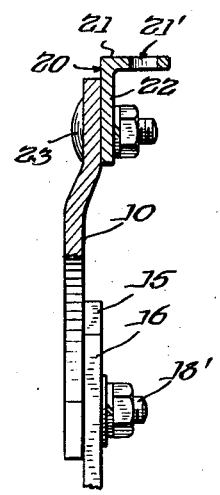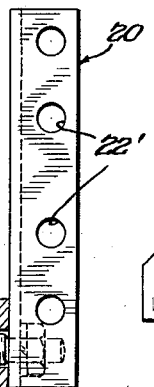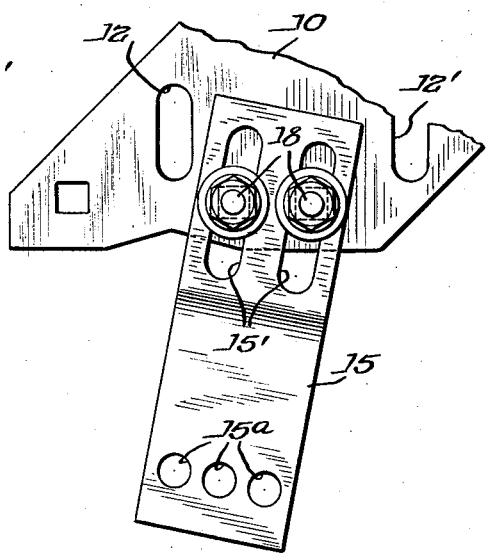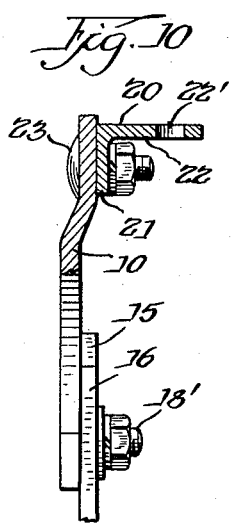

United States Patent Office 2,915,131
Patented Dec. 1, 1959

2,915,131

JOINTER DEVICE MOUNTING BRACKET

Harry G. Yetter, Colchester, Ill.

Application November 25, 1958, Serial No. 776,335

5 Claims. (Cl. 172—736)

This invention relates, generally, to jointers or jointer plates for plows of the moldboard types—jointers such as are attached to and supported by the moldboard of a plow and function to engage and divert those portions of plowed earth carrying debris, trash, obnoxious vegetation, etc., to and onto the bottom of a plowed furrow, then to be covered by that cleaner earth rolling or sliding from the equipped moldboard.

More specifically stated, it is an object of my invention to provide a materially improved bracket mounting for a jointer plate, as above, of such novel construction and design as will permit its adaptation to and usage in connection with any now known or prevalent construction and/or design of moldboard plow whereby a jointer plate can and will be securely supported in operative relation on and to the moldboard.

It is also an important object of the invention to provide a jointer plate mounting bracket which is of simple and sturdy construction, capable of being conveniently and quickly installed on the moldboard of a plow without modification of the plow or its structural components or in any manner requiring adjustment or rearrangement thereof, and which, when installed, will assure the retention and support of the jointer plate in a manner to prevent its displacement or objectionable shifting movement relative to said moldboard as and when the same is subjected to the stresses (normal and abnormal) of plowing operations.

An equally important object of my invention resides in the provision of a jointer plate mounting and securing bracket which, in addition to being universally adaptable to and satisfactorily usable upon any known design or manufacture of moldboard plow, can be installed by unskilled labor without the need of special equipment, tools and/or accesory devices.

Yet another object of the invention is to provide a jointer or jointer plate mounting and securing bracket constructionally including means for bracing the equipped jointer or jointer plate with relation to the plow beam standard and so, additionally assure its immovable and securely mounted positioning on the plow moldboard, said means being conveniently and readily adjustable to the extent that they may be selectively made satisfactorily adaptable in dimensional character or form for usage in instances where different distances of spacing between a plow beam standard and moldboard are encountered.

In a prefatory sense, it may well be here stated that the constructions and designs of manufactured moldboard plows differ to material extents. Oftentimes, the distances between the plow beams or plow standards and moldboards are materially different. Also, it is well known that the manufacturing tolerances in moldboard plows of the same manufacturer are such that these differences of spacing between the beams or beam standards and the moldboards are wide and variable. In consequence, it frequently becomes necessary, when installing a jointer or jointer plate upon these varying constructions, that different sizes and even different forms of attaching brackets or devices must be employed. Therefore, it is a well recognized need and practice that the manufacturers of jointers or jointer plates are required to produce—and the dealer to carry in stock—brackets or attaching devices of different kinds and sizes whereby to adequately or satisfactorily serve these requirements which, obviously, entail considerable expense, confusion, and, generally, dissatisfaction.

Contrawise, the jointer or jointer plate attaching and supporting bracket of my invention will eliminate these objectionable faults and/or features in that, as stated above, it is by reason of its novel construction substantially universally adaptable to and for all kinds, designs or types, of moldboard plows.

The foregoing, as well as other objects, advantages and meritorious teachings of my invention will be in part obvious and in part pointed out in the following detailed disclosure thereof, when taken in conjunction with the accompanying drawings, it being understood that the forms and the adaptations of the invention presented herein are substantially precise and what are now considered to be the best modes of embodying its principles and usages, but that other modifications, changes and usages may be made without departing from its essential features.

In the drawings:

Figure 1 is a perspective view, looking toward the rear of a jointer equipped moldboard plow wherein the jointer is mounted on the moldboard by my bracket invention, the plow beam standard being fragmentarily shown.

Figure 2 is a like view, looking toward the front of the plow, jointed plate and the bracket invention.

Figure 3 is a perspective of my improved bracket.

Figure 4 is a side elevation of the same, looking toward the normally exposed or outer side of the bracket.

Figure 5 is a fragmentary and somewhat enlarged side elevation of the upper end portion of the bracket body plate, looking toward its opposite side, showing the plow beam engaging angle bar stop and plate stop, both adjustable on said bracket body.

Figure 6 is a detail in perspective of the adjustable plate stop.

Figure 7 is a vertical transverse section taken on the line 7—7 of Figure 4, looking in the direction in which the arrows point.

Figure 8 is a fragmentary section similar to Figure 7, but wherein the position of the angle bar stop has been reversed.

Figure 9 is a fragmentary section like that of Figure 8 in which the angle bar stop alone is attached to the bracket body.

Figure 10 is a view similar to Figure 9, but in which the positioning of the angle bar stop on the bracket body has been reversed so as to render its wider side operable.

Figure 11 is a fragmentary vertical transverse section through the bracket body in which the angle bar stop, alone, is connected thereto and is vertically disposed, and, Figure 12 is a fragmentary detail in side elevation of the lower portion of the bracket body plate wherein but one of its attaching or mounting legs is shown connected thereto.

Referring in detail to the drawings, I have shown my improved mounting bracket adapted to a conventional or presently produced form of moldboard plow wherein the beam or beam standard 1 has a bed plate 2 and a frog or support plate 3 fixedly mounted on the lower end thereof. A landslide 4 and share 5 are fixedly connected to the bed plate. A moldboard 6 is similarly connected to the frog 3. The landslide and moldboard converge to constitute a forward earth cutting or entering edge in cooperation with the share 5. They are relatively braced by the usual bars and/or rods 7 and 7' spanning the space therebetween and bolted or otherwise secured to each and to the bed plate 2, as at 8.

It will be understood that this particular design or form of plow may be and is varied and that my invention is equally well adaptable for installation and usage on such variations of moldboard plows.

To turn, direct and bury debris, trash, obnoxious vegetation, etc., containing earth to and in the bottom of a plowed furrow, a jointer 9 consisting of an elongated plate of appropriate gauge metal is provided to the upper edge forward portion of the moldboard 6. The leading end of this jointer is obliqued to conform to and be contiguous with the cutting or earth entering edge of the moldboard, while its forward portion and lower edge are substantially straight, and its rearward or after portion is curved outwardly with relation to said moldboard, all as shown in the Figures 1–3 of the drawings. The forward lower edge of the jointer plate flushly engages with and is supported upon the corresponding edge portion of the moldboard. The adjacent outer surfaces of the moldboard and the jointer plate are contiguous and flush whereby to effect an overall smooth or even face over which plowed earth, etc., will freely move and pass. Such construction and arrangement, as will be understood by workers skilled in this art, is usual and well known.

The bracket constituting my invention is employed to fixedly mount and secure the jointer plate 9 on the moldboard 6 in the position and relationship above described. It comprises a substantially rigid sheet-like body 10 having oblique and relatively parallel forward and rearward ends and straight relatively parallel upper and lower sides. The upper portion of the body has spaced horizontal slots 11 and 11' formed therein and is offset slightly outwardly so that the heads of bolts, presently described, will not interfere with the flush or substantially flush engagement of its main and lower portion with the adjacent face or side of the jointer plate and moldboard. Other relatively transversely spaced, parallel and substantially vertically disposed slots 12 and 12' are formed in the lower portion of the bracket body, being adapted to receive bolts 13 and 13' therethrough whereby the jointer plate can and will be adjustably connected thereto in the manner shown in Figure 3, i.e., in proximity to the forward oblique portion of said plate; washers and nuts collectively indicated by the numeral 14 being engaged with the bolts and the body for an obvious purpose.

Bracket arms 15 and 16 each consisting of flat elongated metal straps serve to fixedly, though adjustably, connect the bracket body 10 to the moldboard 6. The arm 15 has relatively parallel slots 15' and in longitudinally of its upper portion and pairs of spaced transversely disposed openings 15ª in its lower portion. The arm 16, usually though not necessarily smaller than the arm 15, has a slot 16' and spaced longitudinally effected openings 16ª in its upper and lower portions, respectively. Both arms, preferably, are bent slightly as indicated at 17 whereby to permit their substantially flush contact with adjacent portions of the support plate or frog 3 and moldboard, for an obvious purpose. Bolts 18 and 18' are inwardly engaged through openings formed in lower end portions of the bracket body 10 and the slots 15' and 16' of the arms 15 and 16 and secure said arms in fixed adjusted relation to the bracket body. Other bolts 19 and 19' are inwardly engaged through the frog 3 and the adjacent openings 15ª and 16ª in the arms. Thus, the jointer and bracket assembly will be immovably retained in the heretofore described supported position and relation to the moldboard.

It should be here noted that the adjustability of connection between the moldboard and the frog 3, via the bracket 10 and arms 15 and 16, permits the effective and satisfactory adaptation of the invention to different designs or types of moldboard plows and hence, eliminates the need for special or individual brackets or connecting devices.

To brace the jointer plate 9 with respect to the plow beam standard 1 and prevent its movement relatively thereto, as when load or stress (both normal and abnormal) are applied thereto during plowing, an angle bar stop 20, formed with substantially right angularly disposed legs or sides 21 and 22 of different widths and having spaced openings 21' and 22' therein, is positioned transversely of the upper and offset end portion of the bracket body 10 in the manner shown in Figures 1, 2 and 3. Bolts 23 are inwardly engaged through the slots 11 and 11' therein and through certain of adjacent openings 21' or 22' in the angle bar stop legs and serve to securely mount said stop in an adjusted relation to and on the bracket body. A flat substantially rectangularly shaped stop plate 24 of a width greater than that of the angle bar legs is seated on and longitudinally of the laterally disposed leg 21 and is connected thereto by bolts 25 engaging through transverse slots 26 therein and through certain of the openings 21' in said leg. So seated and connected, the extended side of the stop plate is beyond the free side of and parallel to the leg (see Figure 7). Thereby, the plate will have point contact bearing on an adjacent portion of the plow beam standard 1 and will brace the jointer plate in relation thereto, preventing any and all movement of the same toward or in the direction of the beam standard.

Longitudinal and/or transverse adjustment or repositioning of the angle bar stop 20 and the stop plate 24 relative to each other and/or to the jointer plate attaching bracket 10 may be selectively effected by (1) the shifting of the bolts 23 in the bracket body slots 11 and 11' and (2) shifting the bolts 25 in the openings 21' or 22' of the angle bar stop and/or in the slots 26 of the stop plate.

Should there be greater spacing between the jointer plate 9 and the plow beam standard, the angle bar stop 20 can be positioned on and connected to the bracket body 10 in the manner shown in Figure 8 of the drawings wherein the wider leg or side thereof is extended laterally from said body and has the stop plate adjustably mounted on and secured thereto.

If, however, a lesser spacing occurs between the jointer plate and the plow beam standard, the stop plate 24 may be removed from the angle bar stop 20 and said stop then arranged on and bolted to the bracket body 10 in either of the manners shown in Figures 9 and 10, thus exposing either of its legs or sides (narrow or wide) for edge or point bearing contact on an adjacent portion of the beam standard. In other adaptations of my invention, i.e., to certain designs or types of moldboard plows, the angle bar stop 20 may be positioned on and bolted to the bracket body 10 in the manner illustrated by Figure 11 of the drawings. Herein, said stop is vertically or longitudinally positioned on and bolted to said body with either its wide or narrow leg exposed for edge bearing contact with the plow beam standard. Of course, if required, the stop plate 24 can be connected to such exposed leg and adjusted inwardly or outwardly with relation thereto and secured by the aforesaid bolts 25 engaging in the openings 21' or 22' in the angle bar stop and the slots 26 in the stop plate.

Although in that form of my invention shown in Figures 1–4 the jointer plate attaching bracket is connected to the frog 3 by the bracket arms 15 and 16, only the bracket arm 15 may be needed or usable, as illustrated in Figure 12. In such instances, said arm 15, can, because of its slotted connection to the bracket body via the bolts 18, be adjusted to extend therefrom at those different angles as may be required to effect its connection and securing to a support plate or frog or other plow supporting structure.

From the foregoing description, it is believed that the mode of usage of my invention will be understood. It can be adjusted for installation on any known and/or prevalent type of moldboard plow and when installed, will secure the jointer plate in proper fixed mounted position on a moldboard in such relation thereto as to offer but a minimum of resistance to the passage of plowed earth thereover yet, at the same time, assure the deflection or directing of that portion of the plowed earth carrying debris, trash, obnoxious vegetation, etc., to and onto the bottom of the formed furrow where it will be fully covered by earth passing over and from the moldboard. Also, when installed upon a plow, the jointer plate will be braced in a manner which will prevent its inward movement or shifting with relation to the plow beam standard, as and when it is subjected to the pressure of plowed earth passing over and outwardly therefrom. Thus, a material portion of the earth load or stress will be diverted from the jointer plate attaching bracket and taken by the braced jointer plate with obvious security benefit to said bracket.

I claim:

1. A moldboard plow jointer plate attaching bracket, comprising a substantially flat body having horizontally disposed slots formed in the upper end portion thereof and vertically disposed slots formed in the lower portion thereof, bracket arms having longitudinally disposed slots in the upper portions of each, means engageable through said vertical slots in the body and said longitudinal slots in the bracket arms for adjustably interconnecting the same, means on the lower portions of said arms for facilitating connection thereof to the plow support plate, an angle bar stop adjacent the upper portion of said body overlying the horizontal slots therein, means engaged through the angle bar stop and the horizontal slots in said body interconnecting the angle bar stop and the body, the relatively angularly disposed sides of said angle bar stop being of different widths and said angle bar stop being reversible in positioning on the body to selectively expose either of said sides, and auxiliary stop means of a width greater than the widths of the sides of said angle bar stop adjustably connected thereto.

2. A universally adjustable jointer plate attaching bracket for moldboard plows, comprising a sheet-like body, means on the body for vertically adjustably connecting the same to a jointer plate, the lower portion of said body being extended downwardly from and beyond the lower side of the jointer plate, bracket arms connected to and extended downwardly from the body and the jointer plate connectable to a moldboard, a bar stop disposed transversely of and connected to an upper portion of said body, and a stop plate mounted on the bar stop for variable adjustment transversely thereof and disposed at an angle to the body whereby to permit increasing the width of said bar stop.

3. A universally adjustable jointer plate attaching bracket for moldboard plows, comprising a sheet-like body, means thereon for adjustably connecting the same to a jointer plate, the lower portion of the body being disposed downwardly and extended from the lower side of the jointer plate, other means adjustably connected to and extended generally downwardly from the body connectable to a moldboard, a relatively angularly disposed stop connected to a portion of said body in spaced relation to said other means, and a stop plate mounted for variable fixed adjustment on and transversely of said angularly disposed stop whereby to permit increasing the width thereof.

4. A universally adjustable jointer plate attaching bracket for moldboard plows, comprising a body, means thereon for adjustably and fixedly connecting the same to a jointer plate, the lower portion of said body being extended downwardly from and beyond the lower side of the jointer plate, bracket arms adjustably connected to and extended downwardly from the body and the jointer plate connectable at their extended portions to a moldboard, an angle bar stop connected to a portion of the body in spaced relation to the bracket arms for adjustment transversely of said body, the relatively angularly disposed sides of said angle bar stop being of different widths and the angle bar stop being reversible in positioning on the body whereby to selectively expose either of its sides, and a stop plate mountable on the exposed side of the angle bar stop fixedly adjustable transversely thereof whereby to selectively permit increasing its width.

5. A universally adjustable jointer plate attaching bracket for moldboard plows, comprising a body shaped to overlie substantially adjacent portions of a jointer plate and a moldboard, means for adjustably connecting the body to the jointer plate, other means on and adjustable with relation to said body connectable to the moldboard, a bar stop on and connected to a portion of the body, and a stop plate mounted on the bar stop for variable adjustment transversely thereof and disposed at an angle to the body whereby to permit varying the width of said bar stop.

References Cited in the file of this patent

UNITED STATES PATENTS

| | | |
|---|---|---|
| 300,457 | Fish | June 17, 1884 |
| 787,016 | Wimer | Apr. 11, 1905 |
| 2,829,580 | Bauer | Apr. 8, 1958 |